Figure 1:
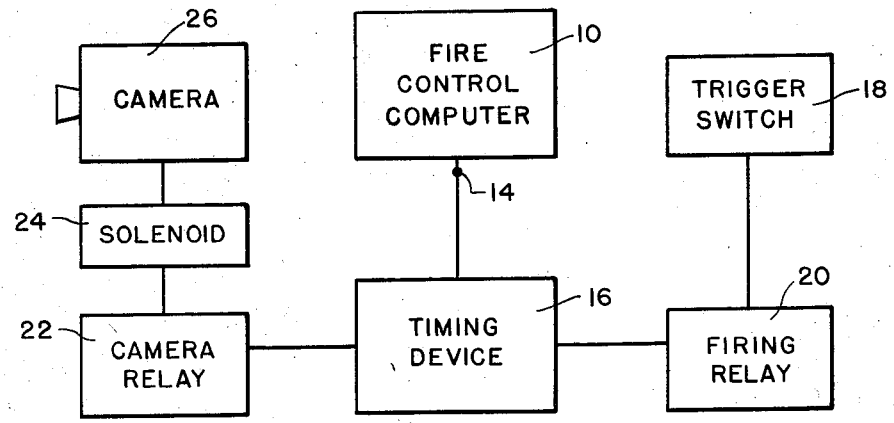

July 15, 1958

W. C. WARD ET AL 2,843,028

MISS-DISTANCE INDICATOR

Filed March 11, 1955

2 Sheets-Sheet 1

INVENTORS
WILLIAM C. WARD
NEWTON E. WARD
BY
ATTORNEYS

July 15, 1958  W. C. WARD ET AL  2,843,028
MISS-DISTANCE INDICATOR

Filed March 11, 1955  2 Sheets—Sheet 2

INVENTORS
WILLIAM C. WARD
NEWTON E. WARD
BY
ATTORNEYS

United States Patent Office 2,843,028
Patented July 15, 1958

2,843,028
MISS-DISTANCE INDICATOR

William C. Ward and Newton E. Ward, China Lake, Calif., assignors to the United States of America as represented by the Secretary of the Navy Application March 11, 1955, Serial No. 493,840

3 Claims. (Cl. 95—12)

(Granted under Title 35, U. S. Code (1952), sec. 266)

The invention described herein may be manufactured and used by or for the Government of the United States of America for governmental purposes without the payment of any royalties thereon or therefor.

This invention relates to a miss-distance indicator, a training aid for increasing the marksmanship of pilots of fighter aircraft, in particular.

The performance of military aircraft has increased tremendously since the end of World War II. The very high speeds of both fighter and bomber type aircraft has made it more difficult for fighters to destroy bombers and/or other fighters, because of the relatively small favorable speed differential of fighters over bombers which reduces the opportunity of making repeated passes at a bomber and limits the angles at which successful attacks can be made.

To counterbalance these developments, there has been a steady improvement in the weapons provided fighters such as an increase in the size of guns from 50 caliber machine guns to 20 millimeter cannon and in the use of air to air rockets in the place of guns or cannon. There have also been improvements in the fire control equipment provided the fighter pilot so that the probability of obtaining hits on the target in a single attack has been improved.

Modern aircraft fire control systems include some form of a computer, generally an analog computer, which is provided with information such as the range from the fighter to the target, the rate of change of the range, the ammunition ballistics, the atmospheric pressure, the velocity of the attacking fighter, and fighter acceleration, and if rockets are being fired, the rocket burning time, the angle of attack of the fighter, and its angle of skid. From the information provided, the computer derives the proper angle the attacking fighter must lead the target in order for the particular type of missile which is being fired to hit the target. In the process of solving the ballistic equations in order for the missile to intercept the target, the time of flight, $t_f$ is computed, and is usually presented as an electrical signal variation. Typically the signal variation may be indicated by magnitude variations of a D.-C. voltage or current or by modulation of an A.-C. voltage or current.

Fighter pilots are trained to use such aircraft fire control systems by attacking suitable targets such as an object which is towed by another aircraft, or a free flying robot type target. Fighter planes in the past have been equipped with gun cameras which take pictures during the firing of tracer type ammunition at the target by the fighter aircraft. From such pictures it is possible for the pilot to learn the number of hits obtained in a given attack and/or the magnitude and direction of the misses. When such a training mission is being performed, the pilot will normally make numerous attacks on the target; and after having expended his ammunition, he will land. The film from the gun camera is then developed and evaluated. The development of the film and evaluation of the results takes a considerable period of time, a minimum of several hours, so that by the time the pilot knows how well, or poorly, he was shooting, he is likely to have forgotten what he did during the course of each attack.

The most desirable time to provide the pilot of a fighter aircraft with information as to the direction and magnitude of the errors with which the weapons he fired, may have missed the target, is as soon after the attack as possible. When this is done, the pilot will remember the action he took during each attack and see the consequences. If this information is available before the second attack he can endeavor to eliminate the cause, or causes, of the previous errors and thus more rapidly and accurately improve his marksmanship.

It is, therefore, an object of this invention to provide a relatively simple and inexpensive device for providing the pilot of an aircraft with information as to the magnitude and direction of any error he may have made in firing at a target during an attack while the pilot is still air-borne.

It is a further object of this invention to provide the pilot of an aircraft with a picture which shows the direction and magnitude of such error as may have occurred while making an attack on a target within a matter of minutes after the attack is made.

It is a still further object of this invention to provide a pilot of an aircraft with a picture showing the direction and magnitude of the distance between the target and the missiles fired at the target at the time the missiles are closest to the target.

Figure 4:
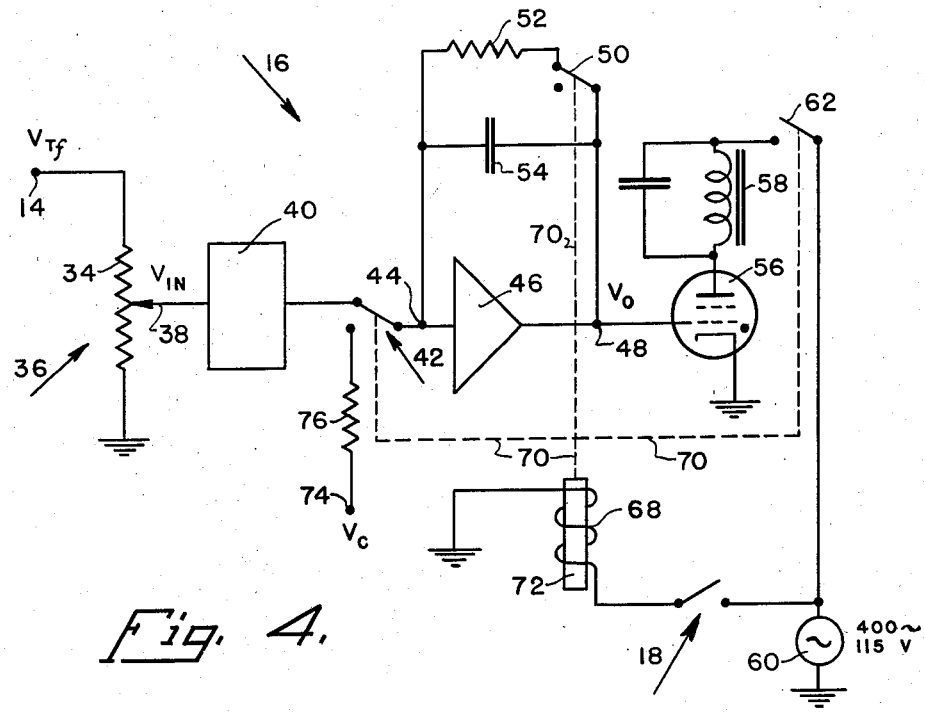
Figure 2:
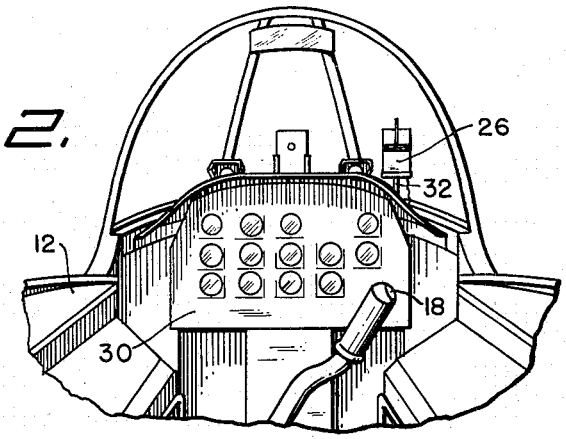
Figure 3:
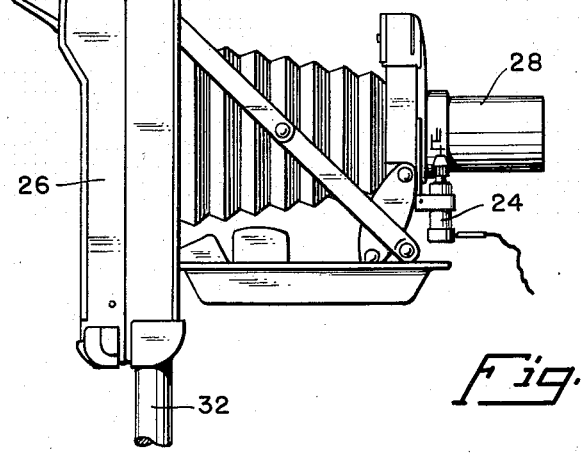
Figure 5:
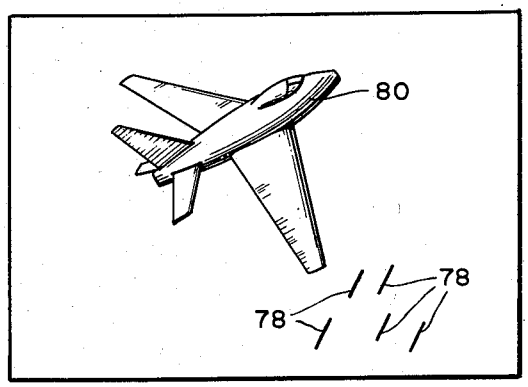

Other objects and many of the attendant advantages of this invention will be readily appreciated as the same become better understood by reference to the following detailed description when considered in connection with the accompanying drawing wherein:

Fig. 1 is a block diagram of the invention,
Fig. 2 is a broken away view of the cockpit of a fighter aircraft,
Fig. 3 is a side elevation of a camera and its mount,
Fig. 4 is a schematic diagram of a timing device, and
Fig. 5 is an example of the type of picture supplied the pilot.

Referring now to the drawings wherein like reference characters designate like or corresponding parts throughout the several views, there is seen in Fig. 1 a block diagram of the miss-distance indicator. The computer 10 of an aircraft fire control system with which the aircraft 12, illustrated partially in Fig. 2, is supplied, produces a positive D. C. output voltage, $V_{tf}$ at terminal 14. The magnitude of voltage $V_{tf}$ is directly proportional to the time of flight $t_f$ of the missile to the point where the missile will intercept the target. Voltage $V_{tf}$ is applied to the timing device 16. When the pilot presses trigger switch 18 which is shown as being mounted on the control stick of the cockpit in Fig. 2, firing relay 20 is energized. When this occurs, the timing device 16 becomes operational, and at the time $t_f$ after trigger switch 18 is closed, timing device 16 energizes camera relay 22. Camera relay 22 then energizes solenoid 24 which is mounted beside camera 26 and operates the shutter mechanism of camera 26 to expose the film in the camera at the time the fired missiles are closest to the target. Camera 26 is of the type, such as the "Land camera," that can produce a positive print within a relatively short time, i. e., 60 seconds, after the negative is exposed.

Camera 26 is mounted in the cockpit of aircraft 12 as seen in Fig. 2 so as to point in the same direction that the armament of the aircraft is fired. Camera 26 is provided with a fairly wide angle lens 28 so that alignment between the camera and the armament is not particularly critical. Camera 26 is illustrated in Fig. 2 as being secured to the instrument panel 30 of aircraft 12 by bracket 32. The particular location of camera 26 in the cockpit of aircraft 12 is not critical since camera 26 may be mounted in any suitable space where it has a reasonable field of view in the direction the armament is fired and which place is accessible to the pilot so that he may operate camera 26 and obtain the picture shortly after the film has been exposed.

Fig. 4 is a schematic diagram of one form of timer 16. Voltage $V_{tf}$ from computer 10 is applied from output terminal 14 of fire control computer 10 across resistor 34 of potentiometer 36. A portion of voltage $V_{tf}$ is picked off by arm 38 of potentiometer 36. This voltage, the input voltage to the timer $V_{in}$ is applied to a conventional cathode follower 40. The output of cathode follower 40 is applied through a single pole double throw switch 42 of firing relay 20 to the input terminal 44 of a high gain D. C. amplifier 46. Amplifier 46, as the result of positive feedback, has substantially an infinite gain over its region of operation. In order to reduce the gain of amplifier 46, negative feedback is obtained by connecting a portion of the output of amplifier 46 at output terminal 48, through the single pole double throw switch 50 of firing relay 20 and resistor 52 to the input terminal 44 of amplifier 46. Condenser 54 is connected between the output terminal 48 and input terminal 44 and shunts negative feedback resistor 52 when switch 50 is in the position illustrated in Fig. 4. Output terminal 48 is also connected to the control grid of thyratron 56, and the coil 58 of camera relay 22 is connected in the plate circuit of thyratron 56. A. C. potential from a suitable source, such as generator 60 is applied to the plate of thyratron 56 when switch 62 of firing relay 20 is closed.

The closure of trigger switch 18 by the pilot, when he fires his armament, energizes coil 68 of firing relay 20. Relay 20 is of the conventional type which will remain energized a predetermined period of time after switch 18 is closed. The period being selected so that the shutter of camera 26 will not be operated until after each exposed film has had time to be developed.

In operation, the aircraft 12 is provided with tracer type ammunition so that its position can be easily photographed in daylight. When the pilot sights the target and commits himself to making an attack, he tracks the target. During the period of time that the pilot is tracking the target the computer, in the process of solving the fire control problem, will be deriving the time of flight to the target of the particular missile to be fired. In a preferred type of computer this information is available as the positive D. C. voltage $V_{tf}$. A portion of $V_{tf}$ is picked off by potentiometer 36 and applied to the D. C. amplifier 46 through the cathode follower 40, switch 42 and input terminal 44. When the firing relay 20 is not energized, switches 42, 50 and 62 are in the position illustrated in Fig. 4. Switches 42, 50 and 62 are mechanically linked by shafts 70, which are illustrated as a dashed line, to armature 72 of firing relay 20. Amplifier 46 amplifies the input voltage, and, as a result of the feedback circuits, the output voltage, $V_o$, the potential at output terminal 48 will be a predetermined function of the input voltage $V_{in}$. Current will flow through the negative feedback resistor 52 so that a voltage will exist across it. Condenser 54 charges up so that the voltage across it equals the voltage across resistor 52. The potential at output terminal 48 is sufficiently negative to bias thyratron 56 to cut off. Also, thyratron 56 will not be able to conduct until switch 62 closes when time relay 20 is energized.

When the pilot presses the firing switch 18, the missiles are fired, and coil 68 of firing relay 20 is energized. Armature 72 is pulled in and causes the switches 42, 50 and 62 to change position. Switch 42 now connects a negative voltage $V_c$ to the input terminal 44 from terminal 74 through resistor 76. Negative feedback through resistor 52 stops when switch 50 opens, and condenser 54 begins to discharge through resistor 76. As condenser 54 discharges, the voltage across it decreases at a constant rate because of the high gain characteristics of amplifier 46 when negative feedback through resistor 52 no longer occurs. The time that it takes for the voltage across condenser 54 to decrease to the voltage at which thyratron 56 conducts is equal to the time of flight $t_f$ as computed by the computer 10. To do this the location of arm 38 is adjusted so that the desired result is obtained. When the voltage at terminal 48 has risen to the voltage at which thyratron 56 will conduct, the tube 56 conducts because switch 62 closed when coil 68 was energized, and current will flow through the coil 58 of camera relay 22. Relay 22 then causes solenoid 24 to be energized to operate the shutter mechanism of camera 26 at the time when the missiles should intersect the target, or the time at which the missiles will pass closest to the target.

Normally the missiles will be fired in bursts, the length of the burst is known approximately so that a fixed additional period of time can be added to the time of flight, $t_f$ as computed by computer 10 by adjustment of the potentiometer arm 38, so that the camera shutter will be operated at the time the middle round, or rounds, are passing closest to the target. It is, of course, essential that the pilot continue to track the target for a period of time after he ceases to fire his armament which period is equal to the time of flight so that the camera will be pointing in the general direction of the target when the shutter is opened.

Fig. 5 is an example of the type of picture that is made available to the pilot. It shows streaks of light made by the tracer type devices of a plurality of rockets 78 at the time they are passing closest to the target 80. From Fig. 5 the pilot will observe that his rocket passed below and slightly to the right of the target. He should remember what he was doing at the time he made the attack, and before he makes a second attack on the target he will know the direction and magnitude and probable cause of the miss on the first attack. By repeated attacks and knowing the results of each attack before he makes the next the pilot will in a short period of time learn to use his fire control system and ammunition properly.

In describing the use of the miss-distance indicator reference has been made to a fighter type aircraft firing armament parallel to the flight path of the aircraft. The invention is not so limited, and can also be used for training of gunners of aircraft, for example. The particular type of timing circuit used is a matter of choice, the one illustrated being a preferred model.

Obviously many modifications and variations of the present invention are possible in the light of the above teachings. It is therefore to be understood that within the scope of the appended claims the invention may be practiced otherwise than as specifically described.

What is claimed is:

1. A miss-distance indicator for an aircraft having means for firing tracer type missiles, comprising in combination, a camera means mounting the camera on the aircraft in proximity with the pilot and so that the camera will take a picture in the direction the armament is fired, a solenoid actuator for opening the shutter of the camera, a camera relay for energizing the solenoid, a computer for producing a voltage which is a predetermined function of the time of flight of the missile from the aircraft to the point of intercept with the target, a timer, the voltage from the computer being applied to the timer, a firing relay, and a trigger switch, said trigger switch energizing said firing relay when the trigger switch is closed, said firing relay when energized causing the timer, after a period of time, substantially equal to the time of flight of the missiles to the intercept point with the target, to energize the camera relay, whereby said camera relay energizes the solenoid and causes the film of the camera to be exposed at the time the missiles are closest to the target.

2. In combination an aircraft and a miss-distance determination system therefor, said aircraft including means for firing missiles and fire-control computing means associated with said firing means, said computing means including means for computing the time of flight of a missile from the time of firing to the time of intercept with a target, said miss-distance determination system comprising a camera mounted in said aircraft in a position to take a picture in the direction a missile is fired, camera shutter actuating means, and means responsive to operation of said firing means to operate said shutter actuating means at said computed time subsequent to said operation of said firing means.

3. The combination of claim 2 wherein said camera is of the type adapted to produce a positive print shortly after its film has been exposed, whereby a photograph of the fired missile at its nearest point to the target is made available while the aircraft is still airborne so that further firings may be made immediately to correct for errors in tactics in the earlier firing.

References Cited in the file of this patent

UNITED STATES PATENTS

| | | |
|---|---|---|
| 2,283,788 | Briechle et al. | May 19, 1942 |
| 2,346,079 | Newton | Apr. 4, 1944 |
| 2,382,981 | Edgerton | Aug. 21, 1945 |
| 2,408,764 | Edgerton | Oct. 8, 1946 |
| 2,419,978 | Wildman | May 6, 1947 |
| 2,463,233 | Alexanderson | Mar. 1, 1949 |